(12) United States Patent
Carney (10) Patent No.: US 6,369,708 B2
(45) Date of Patent: Apr. 9, 2002

(54) INTRUSION ALARM AND DETECTION SYSTEM

(76) Inventor: William P. Carney, 4 High Ridge La., Oyster Bay, NY (US) 11771

( * ) Notice: Subject to any disclaimer, the term of this patent is extended or adjusted under 35 U.S.C. 154(b) by 0 days.

(21) Appl. No.: 09/804,801

(22) Filed: Mar. 14, 2001

Related U.S. Application Data

(63) Continuation-in-part of application No. 09/624,513, filed on Jul. 24, 2000, which is a continuation-in-part of application No. 09/372,836, filed on Aug. 12, 1999, now Pat. No. 6,137,405.

(51) Int. Cl.$^7$ ............................................. G08B 13/00
(52) U.S. Cl. ..................... 340/541; 340/543; 340/545
(58) Field of Search ............................... 340/541, 539, 340/825.69, 542, 543, 544, 545, 835

(56) References Cited

U.S. PATENT DOCUMENTS

| | | | | |
|---|---|---|---|---|
| 3,906,348 A | * | 9/1975 | Willmott | 325/37 |
| 4,383,242 A | * | 5/1983 | Sassover et al. | 340/63 |
| 4,496,942 A | * | 1/1985 | Matsuoka | 340/696 |
| 4,535,333 A | * | 8/1985 | Twardowski | 340/539 |
| 4,602,246 A | * | 7/1986 | Jensen | 340/554 |
| 4,672,365 A | * | 6/1987 | Gehman et al. | 340/539 |
| 4,794,368 A | * | 12/1988 | Grossheim et al. | 340/527 |
| 4,833,449 A | * | 5/1989 | Gaffiganj | 340/539 |
| 4,897,630 A | * | 1/1990 | Nykerk | 340/426 |
| 4,912,463 A | * | 3/1990 | Li | 340/825.69 |
| 4,994,787 A | * | 2/1991 | Kratt et al. | 340/539 |
| 5,010,445 A | * | 4/1991 | Weinold | 361/392 |
| 5,379,453 A | * | 1/1995 | Tigwell | 455/151.2 |
| 5,530,431 A | * | 6/1996 | Wingard | 340/568 |
| 5,621,385 A | * | 4/1997 | Carney | 340/541 |
| 5,808,547 A | * | 9/1998 | Carney | 340/541 |
| 5,841,390 A | * | 11/1998 | Tsui | 341/173 |

* cited by examiner

Primary Examiner—Daryl Pope
(74) Attorney, Agent, or Firm—Charles E. Temko (57) ABSTRACT

An intrusion detection system includes a remote controller activated by a user transmitting a particular RF carrier signal to a self-contained monitor. The self-contained monitor is energized by a primary power source and comprises an RF receiver circuit for receiving the particular RF carrier signal, a tuning code circuit for inputting a tuning code, a nonvolatile memory circuit for storing the tuning code which makes the RF receiver circuit responsive to the particular RF carrier signal, a volatile memory circuit having an armed state and a disarmed state, a motion detector for detecting an intruder in the predetermined space, a timing circuit for measuring a preset period of time and a responder. The user switches the volatile memory circuit from the disarmed state to the armed state by activating the remote controller. The volatile memory circuit is switched from the armed state to the disarmed state by either the volatile memory circuit sensing an interruption in primary power lasting longer than the preset period of time or by the motion detector detecting an intruder. The user tests the state of the volatile memory circuit by manipulating the remote controller to prompt a response from the responder indicating whether the volatile memory circuit is in the armed state or the disarmed state. A response indicating that an intrusion event has occurred warns the user not to enter the predetermined space to avoid the possibility of inadvertently confronting a remaining intruder.

26 Claims, 6 Drawing Sheets

INTRUSION ALARM AND DETECTION SYSTEM

CROSS REFERENCE TO RELATED APPLICATION

This application is a CIP of U.S. patent application Ser. No. 09/624,513, filed Jul. 24, 2000 which is a CIP of U.S. patent application Ser. No. 09/372,836 filed Aug. 12, 1999 now U.S. Pat. No. 6,137,405, issued Oct. 24, 2000.

BACKGROUND OF THE INVENTION

1. Field of the Invention

This invention relates generally to burglar alarm systems and more particularly to a self-contained monitor surveiling a predetermined space for an occurrence of an intrusion. The self-contained monitor may be remotely tested by a returning occupant to determine if an intrusion event has occurred in the predetermined space.

2. Description of Related Art

Burglar alarm systems comprising a self-contained monitor used to surveil a predetermined space having a remote controller transmitting an RF signal to control the self-contained monitor are well known in the prior art. In such systems, the monitor typically includes a primary power source, a motion sensor, a responder and a memory circuit. The motion sensor detects an unauthorized entry into the predetermined space causing the responder to sound an alarm and, at the same time, causing the memory circuit to record the occurrence of the intrusion. In certain prior art systems, the memory also records any interruption of primary power as an intrusion event. Before reentering the premises, a returning occupant activates the remote controller prompting a response from the self-contained monitor to determine if an intrusion event has occurred in order to determine whether it is safe to enter the premises.

Since the personal wellbeing of the returning occupant is at risk, it is essential that the self-contained monitor provides not only a reliable means by which to record an intrusion event but also a reliable means by which to remotely test whether an intrusion has, or has not, occurred. On one hand, it is extremely dangerous for a returning occupant to unwittingly confront an intruder. On the other, it is stressful, inconvenient and time consuming for the returning occupant to seek help mistakenly believing that an intrusion has occurred as a result of a false test report.

A self-contained monitor, employed by a returning occupant to remotely test for a remaining intruder, presents certain problems relating to its reporting accuracy and reliability because such monitors are often located in either apartments or homes where an intruder has the privacy and the time to gain control of the alarm system. In the privacy of an isolated premises, it is possible for the intruder to manipulate the self-contained monitor to purposely produce a false test report which causes the returning occupant to enter his or her premises unaware that the intruder remains therein. Further, in some instances, self-contained monitors are subject to primary power interruptions which may cause false test reports which result in the returning occupant needlessly seeking help. Finally, if the remote controller transmits a fixed frequency RF signal to control the self-contained monitor, the intruder can surreptitiously intercept the signal and easily determine its frequency by using what is known in the industry as a "code grabber". Subsequently, the intruder can gain control of the system by transmitting a duplicate signal causing the self-contained monitor to produce a false test report.

U.S. Pat. No. 6,137,405 which issued to the applicant of the present invention, William P. Carney, on Oct. 24, 2000 teaches an intrusion detection system including a self-contained monitor disposed to surveil a predetermined space for an intrusion event. Should an intrusion event occur during an occupant's absence, the self-contained monitor not only sounds an alarm to frighten away the intruder but also records the occurrence of the event. Upon returning and before reentering the predetermined space, the occupant employs a remote controller to test the self-contained monitor prompting a response therefrom to determine if an intrusion event has occurred and whether or not it is safe to reenter. The self-contained monitor comprises a primary power source, an RF receiver circuit, a PIR motion detector, a memory circuit and a responder. The self-contained monitor is tuned to the remote controller by a tuning code set on a DIP switch in the monitor which matches a tuning code set on a DIP switch in the remote controller. The memory circuit taught by Carney includes a volatile memory circuit defining an armed state and a disarmed state and a nonvolatile memory circuit for storing the tuning code therein. The volatile memory circuit is armed and tested by a particular RF carrier signal transmitted by the remote controller to the self-contained monitor wherein it is qualified by the tuning code. Further, the self-contained monitor is disarmed by either sensing a power interruption or by the motion sensor detecting an intruder. In Carney, the volatile memory circuit can only be rearmed by a particular RF carrier signal qualified by the tuning code stored in the nonvolatile memory. Carney teaches that the tuning code set on the monitor DIP switch may be transferred into the nonvolatile memory circuit by the user manually operating a code transfer switch. Because the user can change the setting on the DIP switch after transferring the tuning code, Carney's disclosure solves the problem of an intruder gaining control of the self-contained monitor by simply observing its DIP switch setting and using the same on an unauthorized remote controller. However, in this disclosure, Carney does not teach a means by which to control the system with other than a fixed frequency RF signal and does not solve the problem of momentary power interruptions causing false intrusion reports.

U.S. patent application, Ser. No. 09/624,513 filed Jul. 24, 2000 by William P. Carney, the applicant of the present invention, is a CIP of his above referenced U.S. Pat. No. 6,137,405. In Ser. No. 09/624,513, Carney discloses an improved intrusion detection system similar to that disclosed in its parent case U.S. Pat. No. 6,137,405 summarized above. Further, in application Ser. No. 09/624,513, Carney teaches a short term energy storage circuit which provides secondary power to a volatile memory circuit for a predetermined period of time so that a momentary interruption of primary power lasting less than the predetermined period of time is not sensed by the volatile memory circuit. By not sensing and by not recording momentary interruptions, the improved intrusion detection system taught by Carney minimizes the number of false intrusion reports generated as a result of primary power interruptions. Therefore, Carney's improved system minimizes the number of times a returning occupant will seek help mistakenly believing an intrusion has occurred as a result of a false intrusion report. However, in this disclosure, Carney does not teach a means by which to control an intrusion detection system with an RF signal other than a fixed frequency RF signal in order to make it difficult for an intruder to intercept the RF signal and duplicate the same to gain control of the system and possibly cause harm to an unsuspecting returning occupant.

As can be seen from the foregoing, there exists a definite need in the art for a self-contained monitor which includes a reliable means by which to record and test for an intrusion event, which generates a minimum number of false intrusion reports due to primary power interruptions and, in addition, employs an RF signal that cannot be easily intercepted and duplicated so that an intruder can gain control of the system and jeopardize the well being of a returning occupant.

SUMMARY OF THE INVENTION

The present invention is directed to a system which includes a reliable means by which to record and test for an intrusion event, a system which generates a minimum number of false intrusion reports due to primary power interruptions and, in addition, employs an RF signal that cannot be easily intercepted and duplicated thereby preventing an intruder from gaining control of the system and jeopardizing the well being of a returning occupant.

A first embodiment of the present invention comprises a self-contained monitor which is energized by a primary power source and which is responsive to an authorized remote controller transmitting a particular RF carrier signal under the control of a user. The self-contained monitor includes a nonvolatile memory circuit for storing a tuning code therein, a tuning code circuit for inputting the tuning code communicating with the nonvolatile memory circuit, a transfer switch communicating with the nonvolatile memory circuit and with the tuning code circuit, an RF receiver circuit communicating with a motion detector, a volatile memory circuit, a responder, and with the nonvolatile memory circuit. The motion detector surveils a predetermined space for the presence of an intruder. The transfer switch is manually activated by the user transferring the tuning code from the tuning code circuit to the nonvolatile memory circuit. The RF receiver circuit is made responsive to the particular RF carrier signal by the tuning code stored in the nonvolatile memory circuit. The volatile memory circuit selectively defines an armed state and a disarmed state. The volatile memory circuit is selectively disarmed by either sensing an interruption of primary power or by the motion detector detecting the intruder. The responder is prompted by the RF receiver circuit responding to the particular RF carrier signal to generate a response or absence thereof indicating one of the states of the volatile memory circuit. The remote controller further comprises a DIP switch and the user manually inputs a code setting thereon representing a binary code defining the tuning code which is transmitted as part of the particular RF carrier signal. The tuning code circuit further comprises a plurality of switches. The user manually inputs the code setting thereon and activates the transfer switch thereby storing the tuning code in the nonvolatile memory circuit for subsequently qualifying the particular RF carrier signal transmitted by the remote controller.

A second embodiment of the present invention comprises a second self-contained monitor which is energized by a primary power source and which is responsive to a second authorized remote controller transmitting a second particular RF carrier signal under the control of a user. The second self-contained monitor includes a nonvolatile memory circuit for storing a second tuning code therein, a second tuning code circuit for inputting the second tuning code communicating with the nonvolatile memory circuit, a transfer switch communicating with the nonvolatile memory circuit and with the second tuning code circuit, an RF receiver circuit communicating with a motion detector, a volatile memory circuit, a responder, and with the nonvolatile memory circuit. The motion detector surveils a predetermined space for the presence of an intruder. The transfer switch is manually activated by the user transferring the second tuning code from the second tuning code circuit to the nonvolatile memory circuit. The RF receiver circuit is made responsive to the second particular RF carrier signal by the second tuning code stored in the nonvolatile memory circuit. The volatile memory circuit selectively defines an armed state and a disarmed state. The volatile memory circuit is selectively disarmed by sensing either an interruption of primary power or the motion detector detecting the intruder. The responder is prompted by the RF receiver circuit responding to the second particular RF carrier signal to generate a response or absence thereof indicating one of the states of the volatile memory circuit. The second remote controller further comprises an encoder chip encoding the second particular RF carrier signal with an identification code defining the second tuning code which is transmitted as part of the second particular RF carrier signal. The second tuning code circuit further comprises a decoder chip for decoding the second particular RF carrier signal. The decoder chip is prompted to extract the identification code from the second particular RF carrier signal during a time period wherein the second particular RF carrier signal is being transmitted and simultaneously the transfer switch is being activated to transfer the identification code into the nonvolatile memory circuit for subsequently qualifying the second particular RF carrier signal transmitted by the second remote controller.

A third embodiment of the present invention comprises a third self-contained monitor energized by a primary power source responsive to a third remote controller transmitting a third particular RF carrier signal under the control of a user. The third self-contained monitor includes a microcontroller communicating with a third tuning code circuit for inputting a third tuning code, a transfer switch communicating with the microcontroller and the third tuning code circuit, an RF receiver circuit communicating with a motion detector and with the microcontroller. The motion detector surveils a predetermined space for the presence of an intruder. The transfer switch is manually activated by the user transferring the third tuning code from the third tuning code circuit to the microcontroller. The microcontroller is programmed to define an emulated volatile memory circuit having an armed state and a disarmed state and is programmed to define an emulated nonvolatile memory circuit for storing the tuning code therein. The RF receiver circuit is made responsive to the third particular RF carrier signal by the third tuning code stored in the emulated nonvolatile memory circuit. The third tuning code includes either a binary code or an identification code. The emulated volatile memory circuit is selectively disarmed by either sensing an interruption of primary power or by the motion detector detecting the intruder. The third self-contained monitor further comprises a clock circuit communicating with the emulated volatile memory circuit such that the emulated volatile memory circuit is not switched to the disarmed state by an interruption in primary power lasting less than a preset period of time as measured by the clock circuit.

DETAILED DESCRIPTION OF THE PREFERRED EMBODIMENTS

Before describing the details of the embodiment of the present invention, a discussion of a prior art remotely controlled self-contained intrusion alarm monitor is considered apposite.

Figure 1:
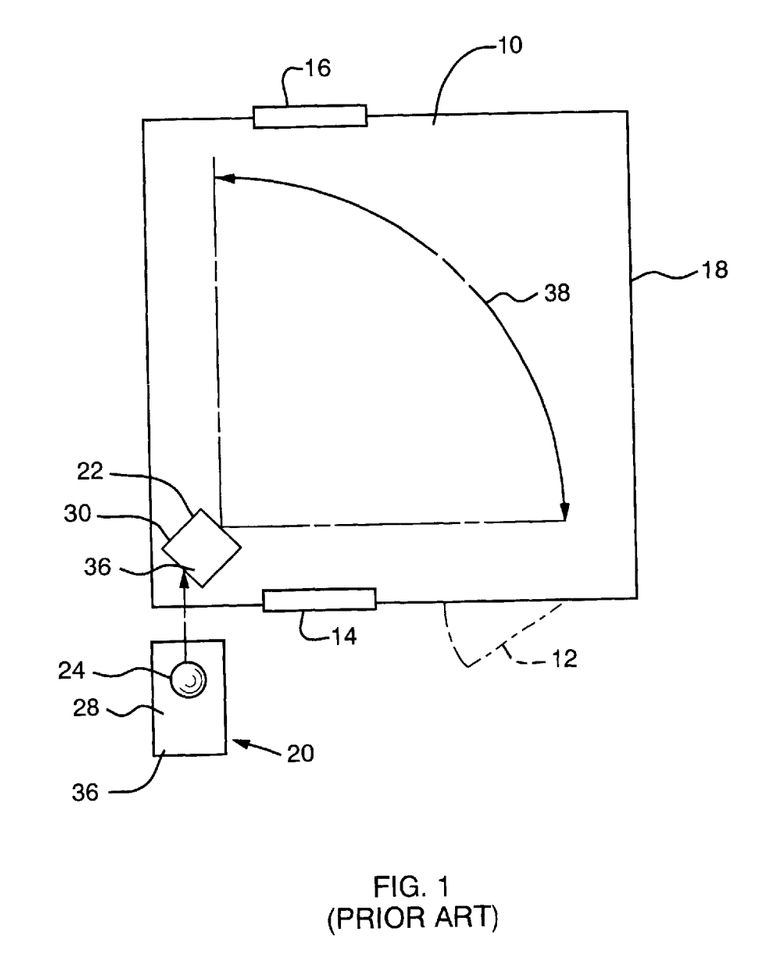
FIG. 1 is a plan view of a prior art self-contained intrusion monitor disposed to surveil a predetermined space. Also included in this figure is a prior art remote controller.

Turning now to the Figures, there is shown in FIG. 1, by way of explanation, a prior art intrusion detection system used to monitor a predetermined space 10 for an intruder. The space 10 includes a door 12 and may or may not include additional openings such as a front window 14 and a rear window 16 depending on a particular premises 18 in which the system is deployed. The system comprises an authorized remote controller generally referred to by reference number 20 and a Passive Infrared (PIR) intrusion monitor 22 having a detection pattern 38. The remote controller 20 may be hand held and includes a button switch 24 and a transmitter circuit 28 and remotely controls the intrusion monitor 22 by transmitting a Radio Frequency (RF) carrier signal to a receiver circuit 30. The intrusion monitor 22 is disposed within the predetermined space 10 and can be armed, disarmed, and tested by the carrier signal initiated by an authorized user manipulating the button switch 24. When armed, the intrusion monitor 22 produces an alarm response if the detection pattern 38 is entered by the intruder. In addition, the intrusion monitor 22 records and may be tested from outside of the premises 18 by the remote controller 20 for the intrusion so that a returning occupant is warned not to reenter the predetermined space 10, thus avoiding the risk of confronting the intruder. The transmitter circuit 28 and the receiver circuit 30 noted in FIG. 1 operate in a manner similar to the manner in which transmitter and receiver circuits operate in remotely controlled garage door systems having a typical button switch remote which causes a particular RF carrier signal to be transmitted to a receiver to either open or close a garage door. So that interference with other systems in the vicinity does not occur, garage door transmitters are generally tuned to associated receivers by any one of a number of well known methods such as by tuning one to the other in the factory, by matching the settings on a plurality of two position switches 36 in the transmitter 20 to the settings on a similar plurality of two position switches 36 in the self-contained monitor 22 or by the use of a known code learning technique wherein receivers are taught by authorized transmitters to be responsive thereto. The plurality of two position switches 36 is often referred to in the art as a Dual In-Line Package (DIP) switch.

Figure 2:
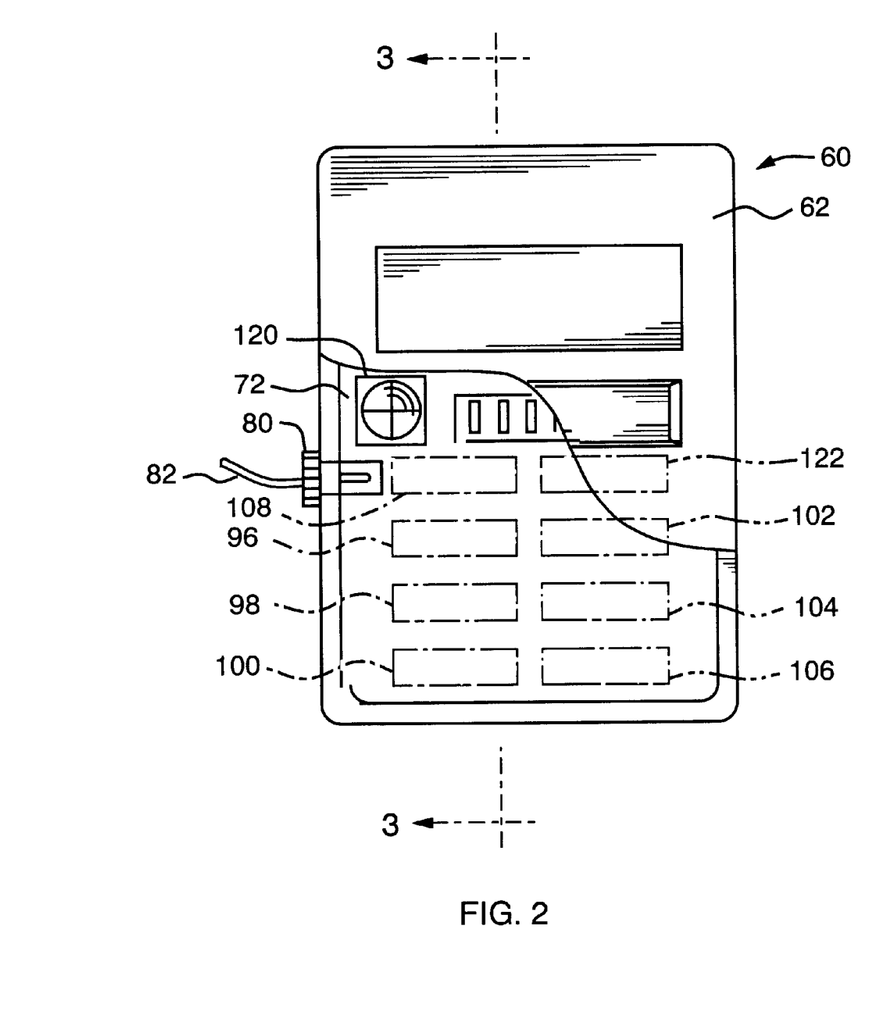
FIG. 2 is a front elevation view of the self-contained monitor embodying the present invention.
Figure 3:
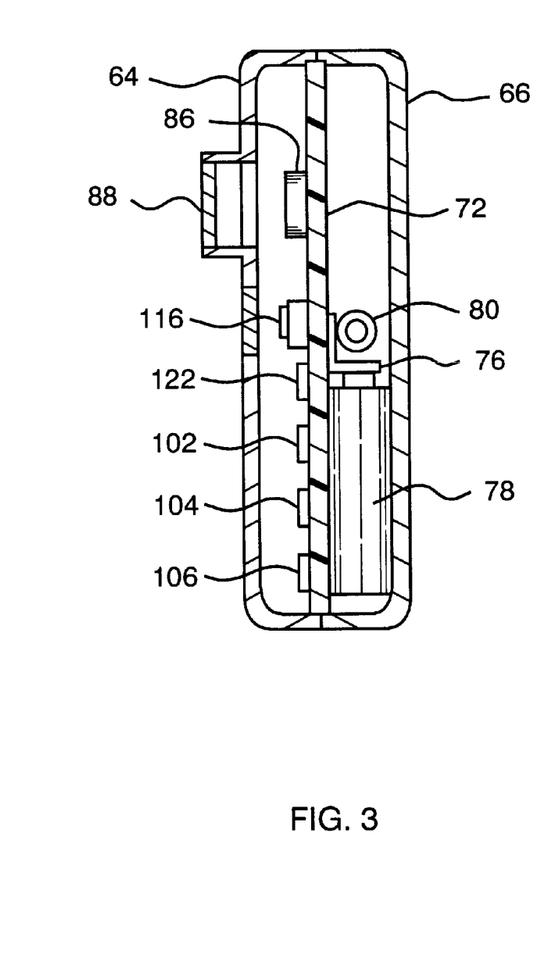
FIG. 3 is a sectional view taken along the line 3—3 in FIG. 2.

FIGS. 2 and 3 illustrate the improved self-contained monitor of a first embodiment of the present invention generally referred to by reference number 60 which includes a housing 62 having a front section 64, pictured partially fragmented, and a rear section 66, each molded from plastic resin and shaped to accommodate the components of the self-contained monitor 60. A printed circuit board (PCB) 72 mounts certain of the electrical components thereon, including a primary power source 76 comprising a battery pack 78 and/or a power jack 80 for an AC adaptor cord 82, a short length of which is shown in FIG. 2. The AC adaptor cord 82 which supplies a DC potential to the electrical components is connected to a well known AC wall outlet adaptor (not shown) that transforms and rectifies an AC line voltage to the DC potential. As will be explained in more detail below, it has been found that because of the power consumed by the electrical components comprising the self-contained monitor 60, it is advantageous to use only the AC wall outlet adaptor as the primary power source providing energy to the components.

In addition, there is shown in FIGS. 2 and 3 a known Passive Infrared (PIR) detector 86 or an equivalent motion sensing device mounted on the PCB 72 adjacent an arcuate fresnel lens 88 affixed to the front section 64 which communicates with a responder 104. The fresnel lens 88 is well known in the art as a means by which to focus infrared energy on the PIR detector 86 in order to sense an intruder entering the detection pattern 38 of the self-contained monitor 60 which is aimed to surveil the predetermined space 10 as shown in FIG. 1. The sensing of the intruder by the PIR detector 86 prompts the responder 104 to sound an alarm in order to frighten away the intruder.

Also mounted on the PCB 72, electrically coupled to the PIR detector 86 and the primary power source 76, are an RF receiver circuit 96, a volatile memory circuit 98, a nonvolatile memory circuit 100, and a logic circuit 102. For the sake of clarity, certain of the aforementioned components are shown diagrammatically in FIG. 2 as defining areas on the PCB 72 bounded by dashed lines pictured thereon. As previously mentioned, the RF receiver circuit 96 is of the type commonly used with garage door openers and is employed in the self-contained monitor 60 to receive the particular RF carrier signal transmitted by the remote controller 20 (FIG. 1). When activated, the remote controller 20 transmits a particular RF carrier signal having encoded therein a binary tuning code in accordance with a binary number set by the user on the DIP switch 36 in (FIG. 1). In the instant invention, the user manipulates the button switch 24 (FIG. 1) in order to selectively transmit coded RF carrier signals such as either a coded RF arm signal or a coded RF test signal. The RF arm signal is coded as such by the user activating the remote controller 20 for about five seconds, thus transmitting the particular RF arm signal for an interval of about five seconds. The RF test signal is coded as such by activating the remote controller 20 for about one second, thus transmitting the particular RF test signal for an interval of about one second. In a method detailed in the disclosure which follows, the RF receiver circuit 96 is made responsive to the particular RF carrier signal by a tuning code stored in the nonvolatile memory circuit 100. The logic circuit 102, prompted by the RF receiver circuit 96 responding to the particular RF carrier signal, directs the self-contained monitor 60 to selectively react to either the longer RF arm signal or the shorter RF test signal. The volatile memory circuit 98 has an armed state and a disarmed state employed to provide the user with a means by which to remotely test for the occurrence of at least one intrusion by transmitting the coded RF test signal.

While leaving the predetermined space 10 (FIG. 1), the user arms the monitor 60 by transmitting the coded RF arm signal. Should an intruder enter the predetermined space during the user's absence, the monitor 60 senses the intrusion and switches the volatile memory circuit 98 from the armed state to the disarmed state thereby activating the responder 104. The sounding of the alarm may prompt a startled intruder to try to mute the responder 104. When the alarm is triggered, the intruder most probably will be able to determine the location of the self-contained monitor 60 and disconnect its power source to silence the alarm. Therefore, it is advantageous to alternatively switch the volatile memory circuit 98 from the armed state to the disarmed state as a result of at least one sustained primary power interruption, as would occur if the intruder disconnects the self-contained monitor 60 from its primary power source 76, recording the same as having been caused by the intruder. Upon returning, the user manipulates the remote controller 20 (FIG. 1) causing it to transmit the coded RF test signal in order to remotely test the state of the volatile memory circuit 98. If the self-contained monitor 60 produces a response, the returning occupant can be reasonably assured that an intrusion has not occurred. If the self-contained monitor 60 does not respond, the returning occupant can be reasonably suspect that an intrusion has occurred and it may not be safe to enter the premises 18 (FIG. 1).

As will be explained in more detail below, the self-contained monitor 60 is made responsive to the remote controller 20 (FIG. 1) via the tuning code installed by the authorized user in the nonvolatile memory circuit 100 which tunes the receiver circuit 96 to the particular RF carrier signal transmitted by the remote controller 20. Further, as presented in this disclosure and as is generally understood in the art, a volatile memory is defined as a device which loses the data stored therein when the primary power source energizing the device is interrupted and, conversely, a nonvolatile memory arrangement does not. For example, the data stored in the volatile memory circuit 98 is lost when the AC adaptor cord 82 is unplugged and, if the self-contained monitor 60 includes the battery pack 78, when the batteries in the battery pack 78 are removed. It is important to note that reconnecting primary power to the self-contained monitor 60 does not restore the volatile memory circuit 98 of the present invention to the armed state. If such were the case, the intruder could simply interrupt and restore power to the self-contained monitor 60 in order to rearm the volatile memory circuit 98, avoid the detection pattern 38 (FIG. 1) of the rearmed self-contained monitor 60, and remain in the premises 18 (FIG. 1) to accost an unsuspecting returning occupant. In the present invention, after the volatile memory circuit 98 is disarmed by either the sensing of the intrusion or the aforementioned sustained power interruption, it can only be restored to the armed state by the coded RF arm signal described above, which matches and is qualified by the tuning code installed by the authorized user in the nonvolatile memory circuit 100 in a manner described below. Since the data stored in the nonvolatile memory circuit 100 is not erased when primary power is interrupted, it is advantageous to store the tuning code therein so that the user does not have to reprogram the system after each time primary power is removed therefrom.

Various types of nonvolatile memory circuit arrangements are known in the industry which, once programmed, do not lose the data stored therein unless reprogrammed by the user. Commercially available long term energy storage capacitors are designed to hold an electrical charge for at least several months and are adapted specifically to provide a back-up voltage for a solid state memory making it nonvolatile by providing an uninterrupted voltage thereto should the primary power be interrupted for a sustained period of time. In their idle state, backup capacitors are kept charged by the primary power. In FIGS. 2 and 3 there is shown a backup capacitor 106 which is electrically coupled to the nonvolatile memory circuit 100 and which may be obtained as a model SG capacitor from Panasonic.

As previously noted, it has been found that when the self-contained monitor 60 is employed to surveil the predetermined space 10 (FIG. 1) and report the occurrence of an intrusion therein, it is advantageous and less costly to supply primary power thereto through the AC adaptor cord 82 rather than via batteries. If the self-contained monitor 60 is powered by batteries, because of the electrical energy consumed performing the aforementioned testing and reporting functions during an extended period of time, the batteries have to be replaced too frequently. Further, the components of the self-contained monitor 60 can be contained in a much smaller package if the housing 62 does not include space for the battery pack 78.

However, when AC power is used as the only primary power source energizing the self-contained monitor 60 and backup batteries are not employed, the self-contained monitor 60 is subject to the momentary and sustained power interruptions associated with AC power lines feeding electrical energy to premises located in apartment buildings, housing developments, commercial buildings and the like. On such AC lines, momentary power interruptions that can affect electronic equipment connected to the line occur quite frequently and are generally caused by environmental conditions such as lightning, high winds and heavy rains and are sometimes of sufficient duration to cause illuminated electric light bulbs to flicker, a phenomenon with which we are familiar. In addition, utility company maintenance of the power grid and local electrical repair work in apartment and commercial buildings also create momentary interruptions. Those skilled in the art recognize AC interruptions which are of short duration as "sags" and "undervoltages". Such interruptions may or may not be visibly detected but are easily sensed by electronic devices such as the volatile memory circuit 100. Industry studies show that utility company customers can expect a substantial number of such faults per year occurring on their AC power lines. Sustained interruptions are typically the result of hurricanes, blizzards, ice storms and utility company major power failures and occur far less frequently than momentary interruptions. Such occurrences are usually publicized and would be known to a returning occupant. Given that one of the objectives of the present invention is to warn the returning occupant that there exists the possibility of an intruder remaining in his or her premises, it is safe for the user to assume that a sustained power interruption recorded by the self-contained monitor 60 was most probably caused as the result of an intrusion.

To optimize the reporting reliability of the self-contained monitor 60, it is important that momentary power interruptions on the AC power line of say less than a second or two do not cause the volatile memory circuit 98 to switch from the armed to the disarmed state thereby causing the self-contained monitor 60 to respond as if an intrusion had occurred. In FIGS. 2 and 3 there is shown a short term energy storage circuit 108 electrically coupled to the volatile memory circuit 98 supplying secondary power thereto, which in the preferred embodiment, may be a standard capacitor or equivalent thereof, available from any one of a number of sources such as Cornell Dubilier part no. 203U016AK2B. The capacitance value and voltage rating of the capacitor are chosen such that the capacitor acts as a timing circuit supplying a voltage to the volatile memory circuit 98 for a preset period of time before discharging during an interruption of primary power. The preset period of time is selected so that it is longer than most momentary power interruptions exhibited on a typical AC power line, say about two to five seconds. If a momentary power interruption occurs on the AC line, the capacitor in the short term energy storage circuit 108 is a temporary source of electrical energy which prevents the volatile memory circuit 98 from sensing a loss of power and switching from the armed to the disarmed state as a result of the momentary power failure.

In the prior art, there are intrusion detection systems energized by AC power backed up by batteries. It is generally the purpose of the backup batteries to ensure continued surveilance for intrusions during AC power failures. Such systems do not differentiate between momentary and sustained AC power interruptions and the battery backup supplies power to the system during both momentary and sustained interruptions. Unlike the prior art, the self-contained monitor 60 does not react to all power interruptions thereto, rather it records and may be remotely tested for only those that last more than a preset period of time. Those skilled in the art recognize that the capacitance value of the short term energy storage circuit 108 can be selected to coordinate with the combined capacitance of the electrical components in the self-contained monitor 60 to produce the aforementioned preset period of time of up to several seconds. The short term energy storage circuit 108 may also include a standard resistor having an ohmic value selected to facilitate coordinating the electrical characteristics of the short term energy storage circuit 108 with the combined impedance of the other electrical components comprising the self-contained monitor 60. Further, the short term energy storage circuit 108 may be employed in the self-contained monitor 60 wherein the use of a backup battery is made optional so that when the user elects to employ only AC power, the system does not record momentary AC power interruptions. By not recording momentary power interruptions that occur on the AC power line as possibly the result of an intrusion, the system of the present invention minimizes the number of times a returning occupant may needlessly seek help based on the lack of a monitor response to the RF test signal.

Figure 4:
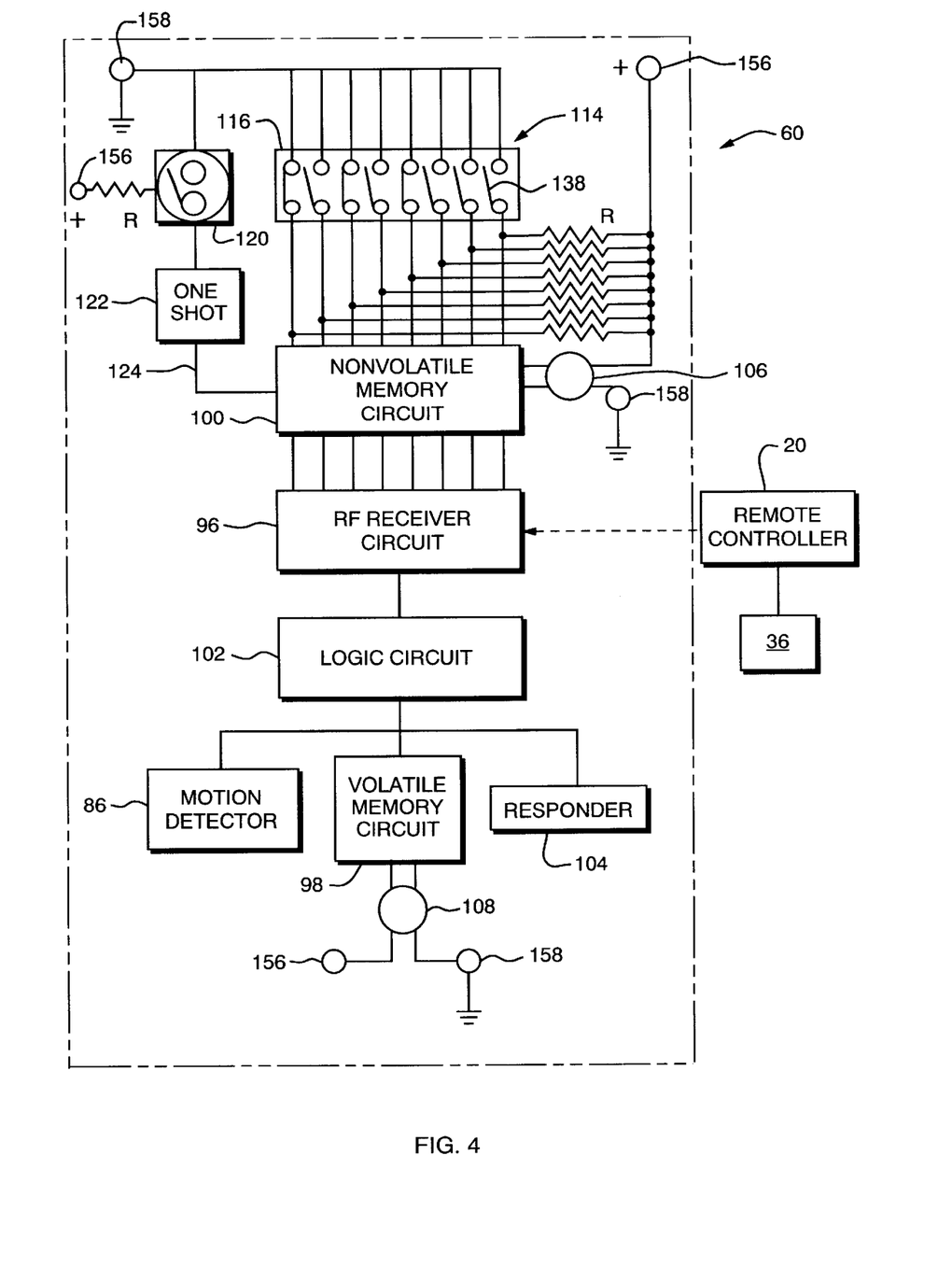
FIG. 4 is a block diagram of a first embodiment of the present invention.

FIG. 4 is a block diagram of a first embodiment of the present invention illustrating the manner in which certain of the components pictured in FIGS. 2 and 3 are electrically coupled to a positive terminal 156 and a ground terminal 158 of the primary power source 76. In the first embodiment, a tuning code circuit generally referred to by reference number 114 for inputting the tuning code comprises a digital switch 116 having eight individual on-off switches 138. Each individual switch 138 may be set manually in either the on or closed position, representing the binary number zero, or the off or open position representing the binary number one. When the user activates a code transfer switch 120, a one shot 122 in a code transfer circuit 124 causes the binary code setting on the digital switch 116 to be transferred into the nonvolatile memory circuit 100 thereby making the receiver circuit 96 responsive to the particular RF carrier signal represented by this binary tuning code. Preferably, the code transfer switch 120 is a normally open miniature single pole single throw PCB mounted pushbutton switch which may be purchased from any one of a number of manufacturers such as Panasonic, part number EVQ-PBCO4M. In the instant invention, the RF receiver circuit 96 is tuned to the particular RF carrier signal in order to not only prevent interference with other RF systems in the vicinity but also prevent the self-contained monitor 60 from being controlled by an unauthorized remote controller employed by an intruder.

The logic circuit 102 is electrically coupled to the RF receiver circuit 96, the motion detector 86, the volatile memory circuit 98 and the responder 104. It monitors the status of the elements to which it is electrically coupled and directs them to respond according to particular system conditions. For example, upon receipt of the RF arm signal to which the RF receiver circuit 96 is responsive, if the volatile memory circuit 98 is not armed, the logic circuit 102 will arm it. Further, if the motion detector 86 senses an intruder and if the volatile memory circuit 98 is armed, the logic circuit 102 will disarm it. In addition, if the volatile memory circuit 98 senses a loss of power and if the same is armed, the logic circuit 102 will disarm it. As a final example, if the RF receiver circuit 96 receives the RF test signal to which it is responsive and if the volatile memory circuit 98 is armed, the logic circuit 102 will direct the responder 104 to generate an audible or a visible response indicating that an intrusion has not occurred and it is safe to enter the surveilled space. The capacitor backup 106 is electrically coupled to the nonvolatile memory circuit 100 and the positive terminal 156 and the ground terminal 158 through which the nonvolatile memory circuit 100 receives primary power. The capacitor backup 106 provides a voltage to the nonvolatile memory circuit 100 during a sustained power interruption such that the tuning code stored therein is not erased as a result thereof.

Also, shown in FIG. 4 is the short term energy storage circuit 108 connected across the positive terminal 156 and the ground terminal 158 through which the volatile memory circuit 98 receives primary power. The short term energy storage circuit 108, or the electrical equivalent thereof, provides a voltage to the volatile memory circuit 98 during momentary interruptions of primary power. Thus, the volatile memory circuit 98 is not switched from the armed to the disarmed state as a result thereof thereby eliminating the possibility of the self-contained monitor 60 producing an erroneous intrusion report because of momentary interruptions.

The first embodiment minimizes false intrusion reports which are a significant problem and inconvenience for a returning occupant who would otherwise needlessly seek help based on an erroneous remote test because a momentary power failure on the AC line switched the volatile memory circuit 98 to the disarmed state. Sustained power interruptions are more likely to be caused by an intruder and, as previously noted, cause the volatile memory circuit 98 to be switched to the disarmed state.

Figure 5:
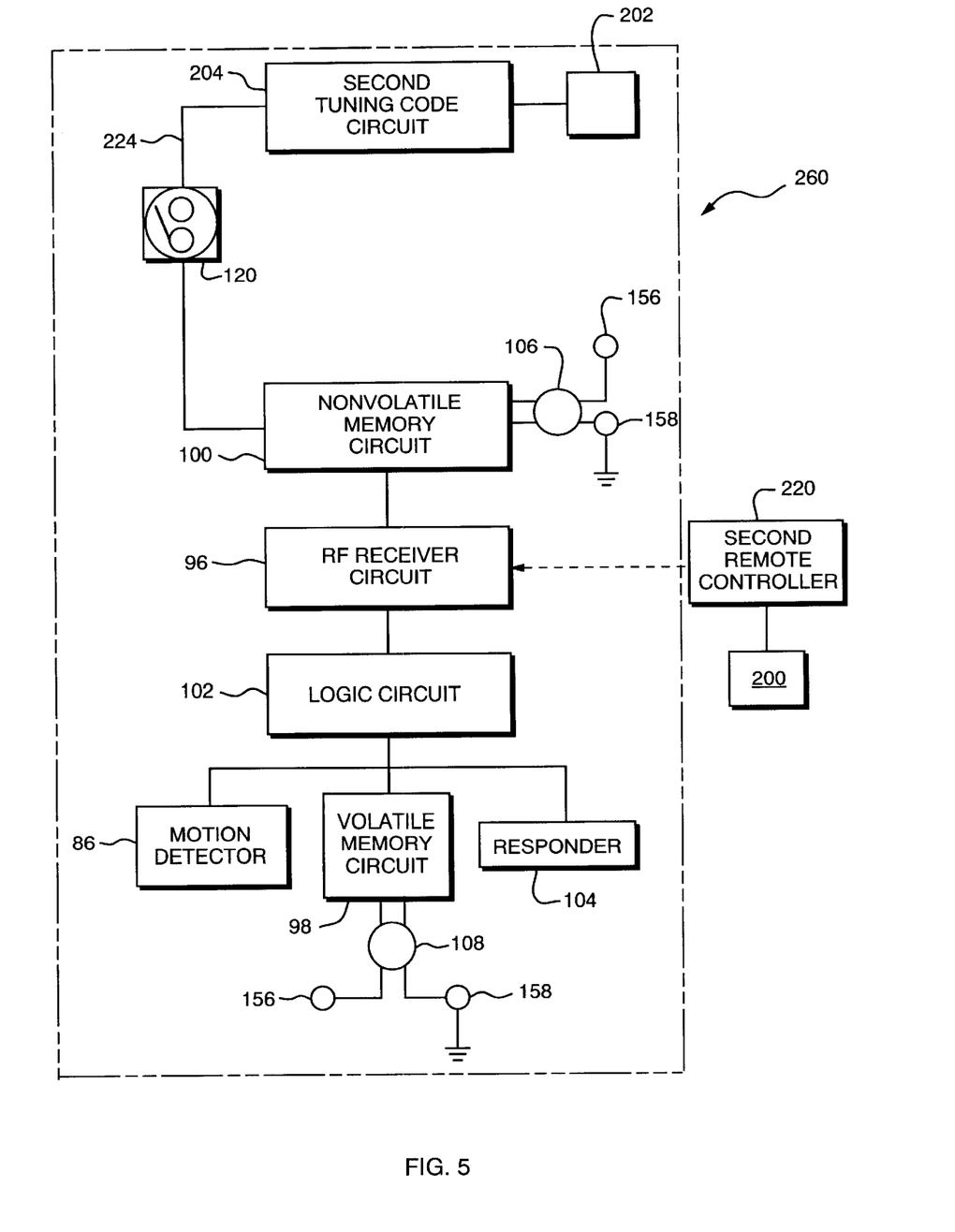
FIG. 5 is a block diagram of a second embodiment of the present invention.

Turning now to FIG. 5, in the drawing there is illustrated a second embodiment of the present invention offering certain variations over the first embodiment. In the first embodiment, a self-contained monitor is tuned to its associated remote controller by a DIP switch in the monitor and a DIP switch in the remote controller, each DIP switch having a binary code set thereon by the user. In the second embodiment, a second remote controller, generally referred to by reference number 220, transmits a second particular RF carrier signal encoded by an encoder chip 200. A second self-contained monitor, generally referred to by reference number 260, is tuned to the second remote controller 220 by a decoder chip 202 included in a second tuning code circuit generally referred to by reference number 204. The decoder chip 202 decodes the second particular RF carrier signal and extracts therefrom a unique identification code which, in a manner defined below, comprises a second tuning code. As is well known in the industry, it is extremely difficult for an intruder to gain control of an alarm system by surreptitiously intercepting and duplicating an RF signal encoded by a complex algorithm contained in an encoder chip. It is less difficult for an intruder to intercept and duplicate an RF signal encoded by a binary code set on a DIP switch. A user may elect to deploy an alarm system wherein an RF carrier signal is encoded by a complex algorithm because this type of system provides a higher level of security than a system which utilizes DIP switches. Typically, the user tunes the second self-contained monitor 260 employing the decoder chip 202 to its associated second remote controller 220 employing the encoder chip 200 by a method known in the industry as code learning. In the code learning method, described below, the user employs the second remote controller 220 to teach the second self-contained monitor 260 to be responsive thereto. Certain of the components shown in FIG. 5 are similar to and perform substantially the same function as components illustrated and described in the previous figures. To avoid needless repetition, these components are not described again in the disclosure of the second embodiment.

In FIG. 5, the elements of the second self-contained monitor 260 are shown in a block diagram. The physical appearance and structure of the second self-contained monitor 260 are substantially the same as those of the self-contained monitor 60 illustrated in FIG. 2. Also, the second remote controller 220 has substantially the same physical appearance and structure as the remote controller 20 shown in FIG. 1. Because of the aforementioned similarities in appearance and structure, and for the sake of brevity, drawings illustrating the appearance of the second self-contained monitor 260 and the second remote controller 220 are not included in the disclosure of the second embodiment. Referring again to FIG. 5, the encoder chip 200 is commercially available from any one of a number of sources such as Microchip Technologies Inc., Chandler, Arz., their model HCS 200. The encoder chip 200 encodes the second particular RF carrier signal transmitted by the second remote controller 220 in accordance with the unique identification code programmed into the encoder chip 200 by its manufacturer. When the second remote controller 220 is activated by the user, the aforementioned identification code is transmitted as a portion of the second particular RF carrier signal. The decoder chip 202 is also available from Microchip Technologies, model HCS 500, and is factory programmed to decode the second particular RF carrier signal encoded by the encoder chip 200. However, in order to make the second self-contained monitor 260 responsive to the second remote controller 220, the decoder chip 202 has to be tuned to the second particular RF carrier signal by the user.

As mentioned above, the second self-contained monitor 260 is tuned to the second remote controller 220 by what is known in the industry as the code learning method. In this method, the user initiates the tuning program by activating the second RF remote controller 220 thereby transmitting the second particular RF carrier signal to the second self-contained monitor 260. Simultaneously, the user manually closes the normally open switch 120 contained in a second code transfer circuit 224 included in the second self-contained monitor 260. While the button switch 120 is held closed by the user, the second particular RF carrier signal received by the RF receiver circuit 96 is processed by the nonvolatile memory circuit 100 and decoder chip 202 in the tuning code circuit 204. The decoder chip 202 extracts the identification code transmitted as part of the second particular RF carrier signal from the second particular RF carrier signal and transfers the identification code to the nonvolatile memory circuit 100 for storing therein. Once stored, the identification code comprises the second tuning code which is subsequently used to qualify the second particular RF carrier signal transmitted by the second remote controller 220 during normal use of the system when the button switch 120 is not being held closed by the user. The second self-contained monitor 260 may be programmed to be responsive to several additional remote controllers using the same code learning procedure for each additional remote controller as outlined above.

As shown in FIG. 5, the RF receiver circuit 96 is electrically coupled to the logic circuit 102, the motion detector 86, the volatile memory circuit 98 and the responder 104. The RF receiver circuit 96, responding to the second particular RF carrier signal, switches the volatile memory circuit 98 from the disarmed state to the armed state. Either the sensing of an intruder by the motion detector 86 or the sensing of an interruption of primary power switches the volatile memory circuit 98 from the armed state to the disarmed state. It is important to note that in the second embodiment the short term energy storage circuit 108, or the electrical equivalent thereof, functions as a timing circuit providing a preset period of time during which the volatile memory circuit 98 does not sense the power interruption as previously described in the disclosure of the first embodiment. Thus, the volatile memory circuit 98 is not switched to the disarmed state during momentary power interruptions lasting less than the preset period of time. It is also important to note that after the volatile memory circuit 98 is switched to the disarmed state, it can only be rearmed by the receiver circuit 96 responding to a qualified RF carrier signal. Further, in the second embodiment, the state of the volatile memory circuit 98 is tested by the second particular RF carrier signal causing the responder 104 to generate a response or nonresponse indicating the state of the volatile memory circuit 98 in a manner similar to that taught in the first embodiment.

Figure 6A:
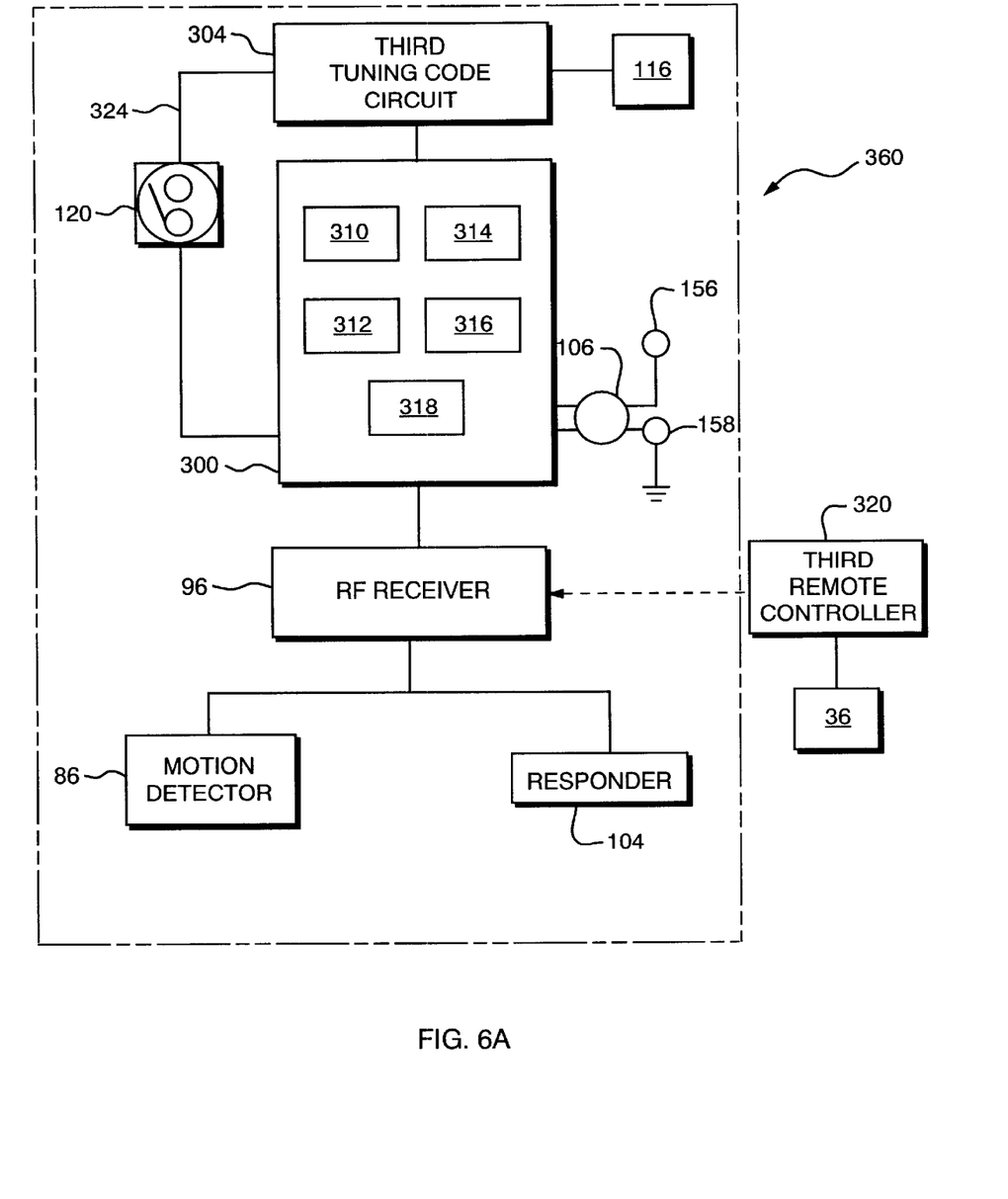
FIG. 6A is a block diagram of a third embodiment of the present invention.

Turning now to FIG. 6, in the drawing there is illustrated a third embodiment of the present invention offering certain variations over the previous embodiments. The self-contained monitors disclosed in the first two aspects of the present invention comprise discrete electronic components which perform various functions. In the third embodiment, a solid state microcontroller chip is employed in place of a number of the aforementioned discrete electronic components and is programmed to emulate and perform certain of their functions. A number of the circuit elements shown in FIG. 6 are similar to and perform substantially the same function as circuit elements illustrated and described in previous figures. To avoid needless repetition, such components and their functions are not described again.

In FIG. 6, the elements of a third self-contained monitor, generally referred to by reference number 360, are shown in a block diagram. The physical appearance and structure of the third self-contained monitor 360 are substantially the same as those of the self-contained monitor 60 illustrated in FIG. 2. Also, shown in the block diagram is a third remote controller, generally referred to by reference number 320, which transmits a third particular RF carrier signal. The third remote controller 320 has substantially the same physical appearance and structure as the remote controller 20 shown in FIG. 1. Because of the aforementioned similarities in appearance and structure, and for the sake of brevity, drawings illustrating the appearance of the third self-contained monitor 360 and the third remote controller 320 are not included in the disclosure of the third embodiment. Referring again to FIG. 6, the third self-contained monitor 360 includes a microcontroller 300 which is commercially available as a solid state chip for mounting on a PCB from any one of a number of sources such as Phillips Electronics, their part number 87C750. Microcontroller chips are used in electronic systems because such chips are programmable computers which perform the combined functions of a substantial number of discrete electronic components and typically reduce not only the cost of the system but also its size. The operating characteristics of a system in which a microcontroller chip is employed are programmed into the microcontroller chip by the manufacturer of the system and are usually changed by the system manufacturer modifying the program rather than by changing discrete system components. In FIG. 6, the microcontroller 300 replaces and emulates the functions of certain elements shown in FIG. 4 including: the volatile memory circuit 98; the nonvolatile memory circuit 100; the logic circuit 102; the short term energy storage circuit 108; and the one shot 122 which may comprise a multivibrator one shot. The third self-contained monitor 360 also includes a third tuning code circuit generally referred to by reference number 304 for inputting a third tuning code therein as explained below.

As shown diagrammatically in FIG. 6, the microcontroller 300 is programmed to define an emulated volatile memory circuit 310, an emulated nonvolatile memory circuit 312, an emulated logic circuit 314 and an emulated one shot 316. Further, the microcontroller 300 includes a built-in quartz clock circuit 318 which acts as a timing circuit emulating the function of the short term energy storage circuit 108 (FIG. 4) by measuring elapsed time and preventing the emulated volatile memory circuit 310 from switching to the disarmed state as the result of sensing an interruption in primary power lasting less than a preset period of time. In the third embodiment, the preset period of time is programmed into the microcontroller chip 300 by the manufacturer of the third self-contained monitor 360 who also installs the program to generate the above mentioned emulated circuit functions.

Figure 6B:
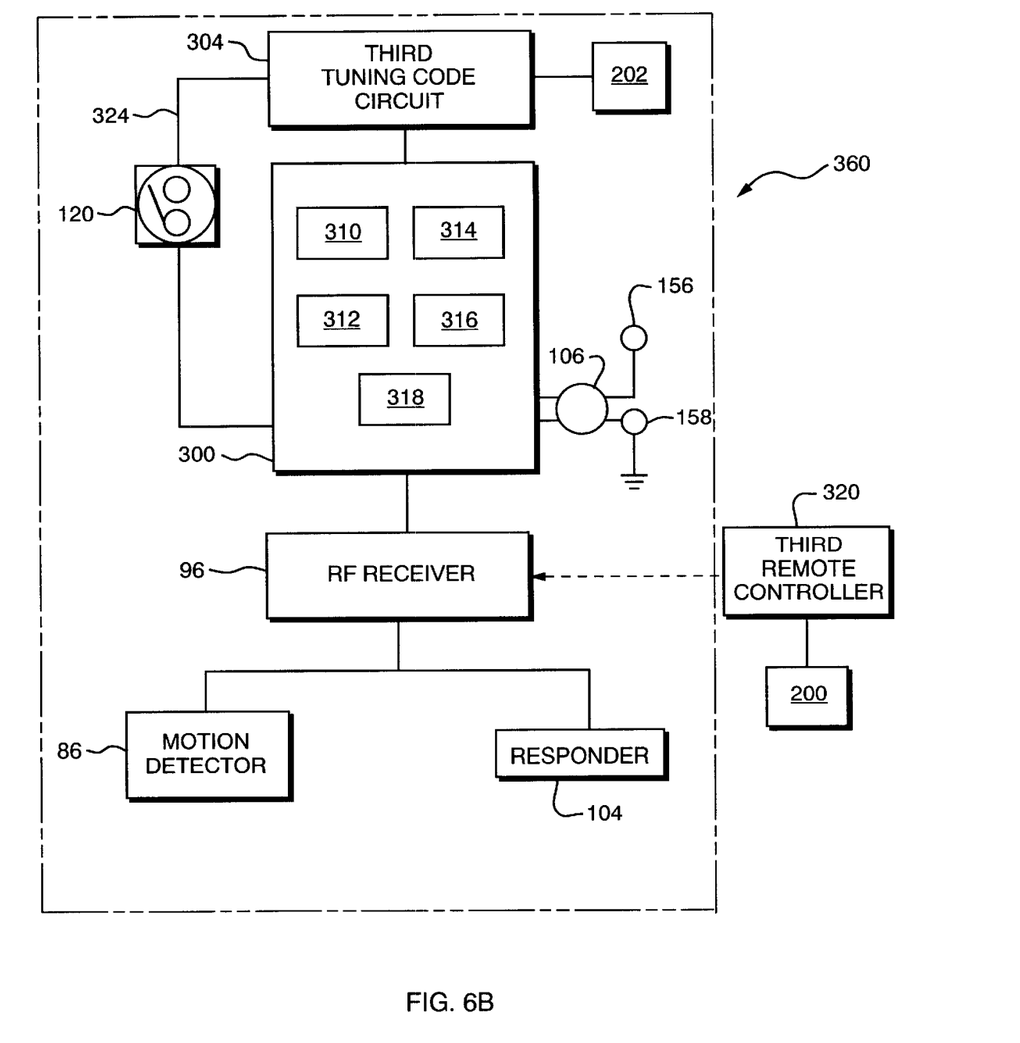
FIG. 6B is a block diagram of an alternative aspect of the third embodiment.

In the third embodiment, illustrated in FIG. 6, the third remote controller 320 includes the DIP switch 36 and the third self-contained monitor 360 includes the third tuning code circuit 304 having the digital switch 116 therein. Accordingly, the third embodiment employs a third tuning code which comprises the binary code, as disclosed in the first embodiment, making the third self-contained monitor 360 responsive to the third remote controller 320. Turning now to FIG. 6A, there is illustrated an alternative aspect of the third embodiment offering certain variations over the third embodiment. Principally, in the alternative aspect, the third remote controller 320 includes the encoder chip 200 rather than the DIP switch 36 and the third tuning code circuit 304 includes the decoder chip 202 rather than the digital switch 116. Accordingly, the alternative aspect of the third embodiment employs an alternative third tuning code which comprises the identification code, as disclosed in the second embodiment, making the third self-contained monitor 360 responsive to the third remote controller 320. In both the third embodiment and the alternative aspect thereof, either the binary code or the identification code is transferred from the third tuning code circuit 304 to the emulated nonvolatile memory circuit 312 by closing the normally open switch 120 in a third transfer circuit 324 using the procedure disclosed in the first embodiment to transfer the binary code and the procedure disclosed in the second embodiment to transfer the identification code.

Further, in the third embodiment, the microcontroller 300 monitors the primary power source voltage supplied thereto and senses any voltage interruption. At a preset period of time after a power interruption starts, the microcontroller 300 is programmed to switch the emulated volatile memory circuit 310 to the disarmed state. The preset period of time is measured by the clock circuit 318 contained in the microcontroller 300 and its duration is determined by the computer program installed therein by the manufacturer of the self-contained monitor 360. The third self-contained monitor 360 may be provided with a preset period of time ranging from a fraction of a second to several seconds. The particular time being selected by the system manufacturer adjusting the program rather than by changing system components. In order to provide optimum intrusion protection, alarm systems such as the alarm system disclosed in the third embodiment should respond to intrusion events as quickly as possible and yet not cause false intrusion reports by responding too quickly. For example, in rural areas where typical power interruptions may last for several seconds, it is advantageous to provide the third self-contained monitor 360 with a preset period of time of say five seconds. In urban areas where typical power outages may last for relatively short time intervals, it is advantageous to supply the third self-contained monitor 360 with a preset period of time of say one second. Accordingly, the third self-contained monitor 360 can be provided with different operating characteristics, as required by various environments, by the manufacturer changing the computer program in order to minimize the number of false intrusion reports caused by primary power interruptions while providing optimum intrusion protection.

Finally, it is important to note that once the emulated volatile memory circuit 310 has been switched to the disarmed state by either sensing a sustained power interruption or by the motion detector 86 sensing an intruder, it can only be rearmed by the RF receiver circuit 96 responding to the third particular RF carrier signal, including either the binary code or the identification code, in a manner as disclosed in either the first embodiment or the second embodiment, respectively. In like manner, the state of the emulated volatile memory circuit 310 is tested by the third particular RF carrier signal causing the responder 104 to generate a response or nonresponse indicating the state thereof.

It is to be understood that the present invention is not limited to the precise details of structure shown and set forth in this specification, for obvious modifications will occur to those skilled in the art to which the invention pertains.

What is claimed is:

1. An intrusion detection system comprising:
   a self-contained monitor energized by a primary power source responsive to a remote controller transmitting a particular RF carrier signal under the control of a user;
   said self contained monitor including a nonvolatile memory circuit storing a tuning code therein, a tuning code circuit for inputting said tuning code communicating with said nonvolatile memory circuit, a transfer switch communicating with said nonvolatile memory circuit and with said tuning code circuit, an RF receiver circuit communicating with a motion detector, a volatile memory circuit, a responder, and with said nonvolatile memory circuit;
   said motion detector surveiling a predetermined space for an intruder;
   said transfer switch being manually activated by said user transferring said tuning code from said tuning code circuit to said nonvolatile memory circuit;
   said RF receiver circuit being made responsive to said particular RF carrier signal by said tuning code stored in said nonvolatile memory circuit;
   said volatile memory circuit selectively defining an armed state and a disarmed state;
   said volatile memory circuit being selectively disarmed by sensing at least one of an interruption of primary power and said motion detector detecting an intruder; and said responder being prompted by said RF receiver circuit responding to said particular RF carrier signal to generate a response indicating one of said states of said volatile memory circuit.

2. An intrusion detection system in accordance with claim 1 wherein said remote controller further comprises a DIP switch, said user manually inputting a code setting thereon representing a binary code defining said tuning code being transmitted as part of said particular RF carrier signal.

3. An intrusion detection system in accordance with claim 2 wherein said tuning code circuit further comprises a plurality of switches, said user manually inputting said code setting thereon and activating said transfer switch thereby storing said tuning code in said nonvolatile memory circuit for subsequently qualifying said particular RF carrier signal transmitted by said remote controller.

4. An intrusion detection system in accordance with claim 3 wherein said user may change said binary code after activating said transfer switch so that said binary code cannot be determined by an intruder observing said switches.

5. An intrusion detection system in accordance with claim 1 wherein said self-contained monitor further comprises a code transfer circuit including a normally open pushbutton switch.

6. An intrusion detection system in accordance with claim 1 wherein said self-contained monitor further comprises a timing circuit communicating with said primary power source and with said volatile memory circuit, said timing circuit providing a preset period of time during which said volatile memory circuit does not sense an interruption of primary power.

7. An intrusion detection system in accordance with claim 6 wherein said timing circuit further comprises a capacitive component.

8. An intrusion detection system in accordance with claim 1 wherein said volatile memory circuit is switched from said disarmed state to said armed state by said RF receiver circuit responding to said particular RF carrier signal.

9. An improved intrusion detection system of the type wherein a self-contained monitor is energized by a primary power source and is responsive to a remote controller transmitting a particular RF carrier signal under the control of a user, said self-contained monitor including an RF receiver circuit communicating with a motion detector surveiling a predetermined space for an intruder and with a responder for reporting the occurrence of an intrusion, the improvement comprising:

a nonvolatile memory circuit storing a tuning code therein communicating with said RF receiver circuit;

a volatile memory circuit selectively defining an armed state and a disarmed state communicating with said motion detector;

a tuning code circuit for inputting said tuning code communicating with said nonvolatile memory circuit;

a transfer switch communicating with said tuning code circuit and said nonvolatile memory circuit being manually activated by said user transferring said tuning code from said tuning code circuit to said nonvolatile memory circuit;

said RF receiver circuit being made responsive to said particular RF carrier signal by said tuning code stored in said nonvolatile memory circuit;

said volatile memory circuit being selectively disarmed by sensing at least one of an interruption of primary power and said motion detector detecting an intruder; and said responder being prompted by said RF receiver circuit responding to said particular RF carrier signal to generate a response indicating one of said states of said volatile memory circuit.

10. An intrusion detection system in accordance with claim 9 wherein said remote controller further comprises an encoder chip encoding said particular RF carrier signal with an identification code defining said tuning code being transmitted as part of said particular RF carrier signal.

11. An intrusion detection system in accordance with claim 10 wherein said tuning code circuit further comprises a decoder chip for decoding said particular RF carrier signal.

12. An intrusion detection system in accordance with claim 11 wherein said decoder chip is prompted to extract said identification code from said particular RF carrier signal during a time period wherein said particular RF carrier signal is being transmitted and simultaneously said transfer switch is being activated to transfer said identification code into said nonvolatile memory circuit for subsequently qualifying said particular RF carrier signal transmitted by said remote controller.

13. An intrusion detection system in accordance with claim 9 wherein said self-contained monitor further comprises a code transfer circuit including a normally open pushbutton switch.

14. An intrusion detection system in accordance with claim 9 wherein said self-contained monitor further comprises a timing circuit communicating with said primary power source and with said volatile memory circuit, said timing circuit providing a preset period of time during which said volatile memory circuit does not sense said interruption of primary power.

15. An intrusion detection system in accordance with claim 14 wherein said timing circuit further comprises a capacitive component.

16. An intrusion detection system in accordance with claim 9 wherein said volatile memory circuit is switched from said disarmed state to said armed state by said RF receiver circuit responding to said particular RF carrier signal.

17. An intrusion detection system comprising:

a self-contained monitor energized by a primary power source responsive to a remote controller transmitting a particular RF carrier signal under the control of a user;

said self-contained monitor including a microcontroller, a motion detector, a tuning code circuit for inputting a tuning code communicating with said microcontroller; a transfer switch communicating with said microcontroller and said tuning code circuit, an RF receiver circuit communicating with said motion detector and said microcontroller;

said motion detector surveiling a predetermined space for an intruder;

said transfer switch being manually activated by said user transferring said tuning code from said tuning code circuit to said microcontroller;

said microcontroller being programmed to define an emulated volatile memory circuit having an armed state and a disarmed state and being programmed to define an emulated nonvolatile memory circuit for storing said tuning code therein;

said RF receiver circuit being made responsive to said particular RF carrier signal by said tuning code stored in said emulated nonvolatile memory circuit;

said tuning code including at least one of a binary code and an identification code; and said emulated volatile memory circuit being disarmed by selectively sensing at least one of an interruption of primary power and said motion detector detecting an intruder.

18. An intrusion detection system in accordance with claim 17 wherein said microcontroller further comprises a clock circuit communicating with said emulated volatile memory circuit such that said emulated volatile memory circuit is not switched to said disarmed state by an interruption in primary power lasting less than a preset period of time as measured by said clock circuit.

19. An intrusion detection system in accordance with claim 17 wherein said emulated volatile memory circuit is switched from said disarmed state to said armed state by said RF receiver circuit responding to said particular RF carrier signal.

20. In combination, an intrusion detection system energized by a primary power source surveiling a predetermined space comprising:

a nonvolatile memory circuit storing a tuning code therein;

a volatile memory circuit defining an armed state and a disarmed state;

a timing circuit measuring a preset period of time coupled to said volatile memory circuit;

an RF transmitter circuit transmitting an RF carrier signal;

an RF receiver circuit communicating with said volatile memory circuit and with said nonvolatile memory circuit, said RF receiver circuit being made responsive to said RF carrier signal by said tuning code; and said volatile memory circuit being switched from said armed state to said disarmed state by sensing an interruption in said primary power source lasting longer than said preset period of time.

21. The combination as claimed in claim 20 wherein said intrusion detection system further comprises a tuning code circuit communicating with said nonvolatile memory circuit for inputting said tuning code therein.

22. The combination as claimed in claim 20 wherein said timing circuit further comprises a short term energy storage circuit supplying secondary power to said volatile memory circuit for said preset period of time so that said volatile memory circuit does not sense said interruption in primary power during said preset period of time.

23. The combination as claimed in claim 20 wherein said timing circuit further comprises a clock circuit which prompts said volatile memory circuit to switch to said disarmed state after said preset period of time has elapsed as measured by said clock circuit.

24. The combination as claimed in claim 20 wherein said volatile memory circuit is switched from said disarmed state to said armed state by said RF receiver circuit responding to said particular RF carrier signal.

25. A method for operating an alarm system including a remote controller controlling a self-contained monitor surveiling a predetermined space, said self-contained monitor having a primary power source energizing a volatile memory circuit selectively defining an armed state and a disarmed state, a tuning code circuit, a nonvolatile memory circuit for storing a tuning code, an intrusion detector and a responder, including the steps of:

a) setting a tuning code in said tuning code circuit;

b) transferring said tuning code to said nonvolatile memory circuit;

c) disposing said self-contained monitor to surveil a predetermined space;

d) switching said self-contained monitor to said armed state;

e) surveiling said predetermined space to detect an intruder;

f) monitoring said primary power source for an interruption of primary power having a duration longer than a predetermined period of time; and g) switching said self-contained monitor from said armed state to said disarmed state as a result of said self-contained monitor alternatively sensing said interruption of primary power and detecting said intruder.

26. The method set forth in claim 25 including the additional step of testing said state of said volatile memory circuit generating a response from said responder indicating one of said states of said volatile memory circuit.

* * * * *